Figure 1:
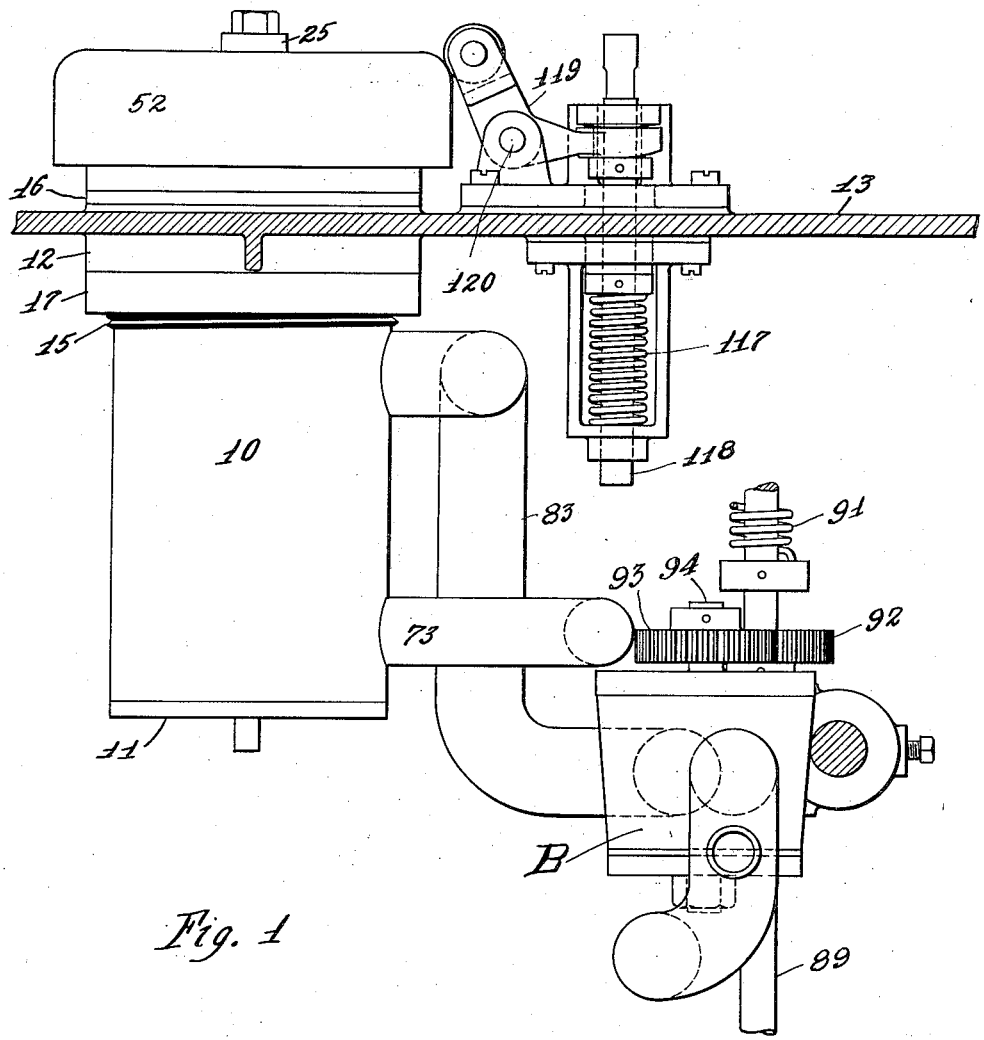

R. MAGRANE.
SEALING MACHINE.
APPLICATION FILED FEB. 26, 1914.

1,134,070.

Patented Mar. 30, 1915.
6 SHEETS—SHEET 1.

WITNESSES:

INVENTOR
Robert Magrane

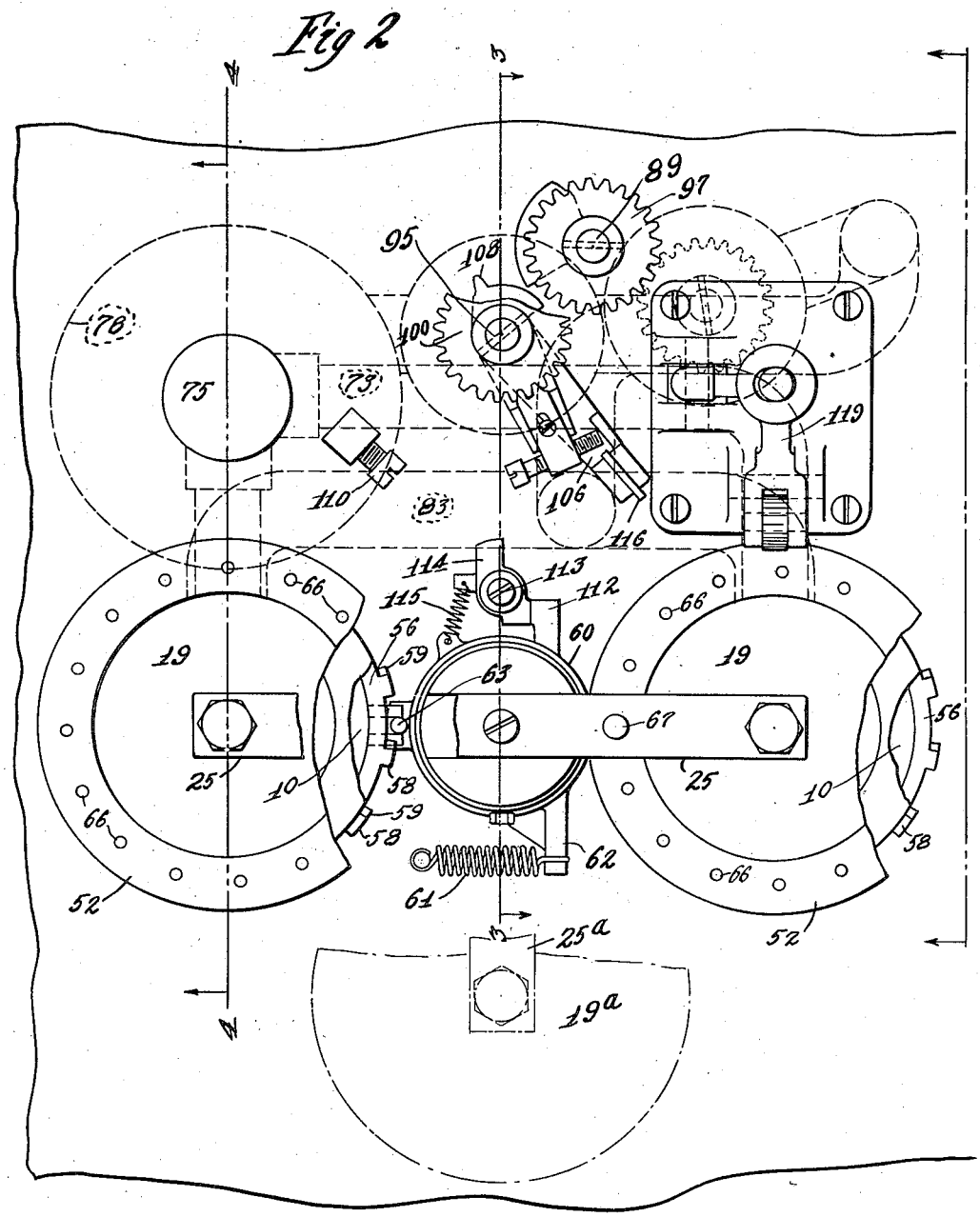

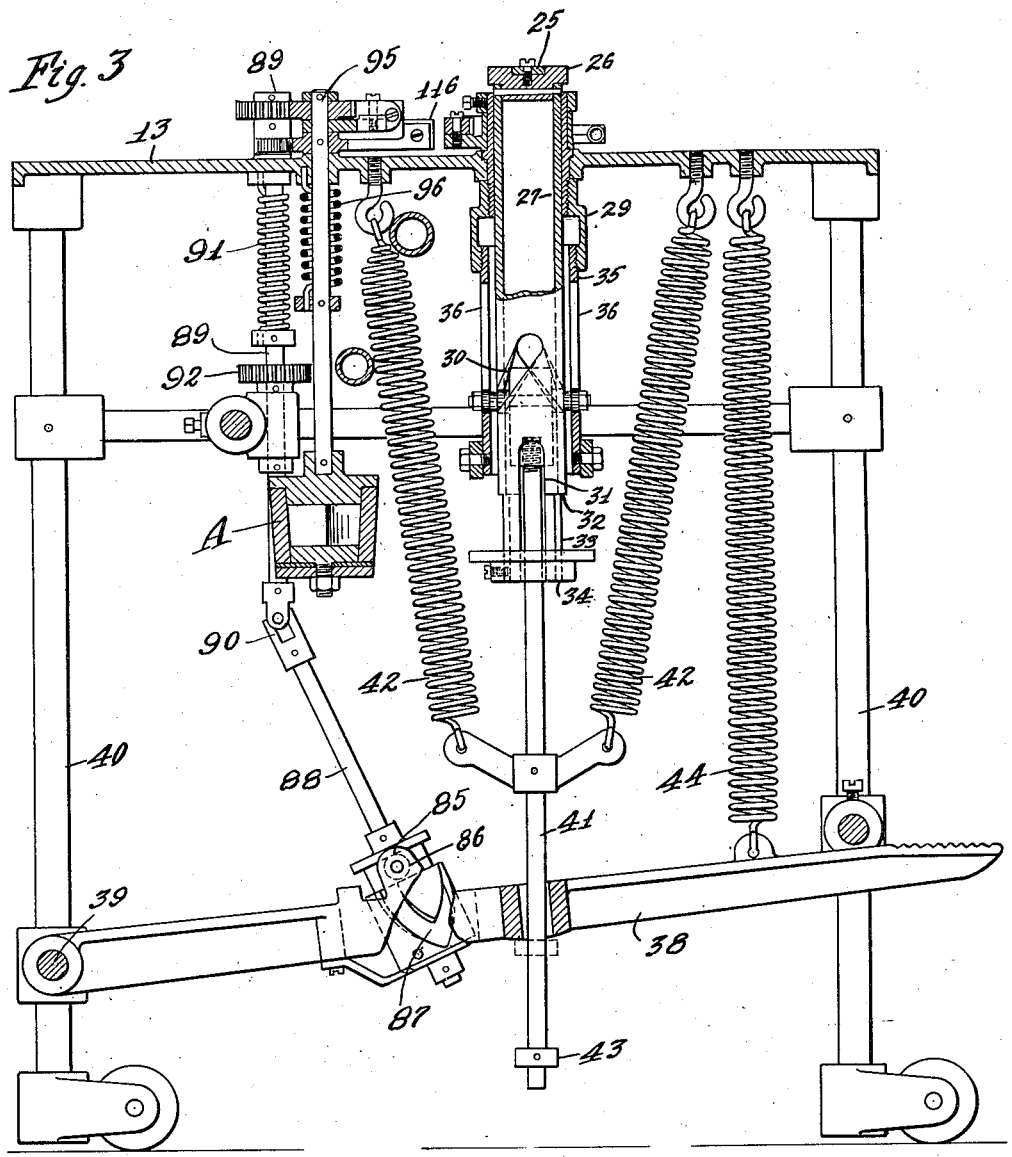

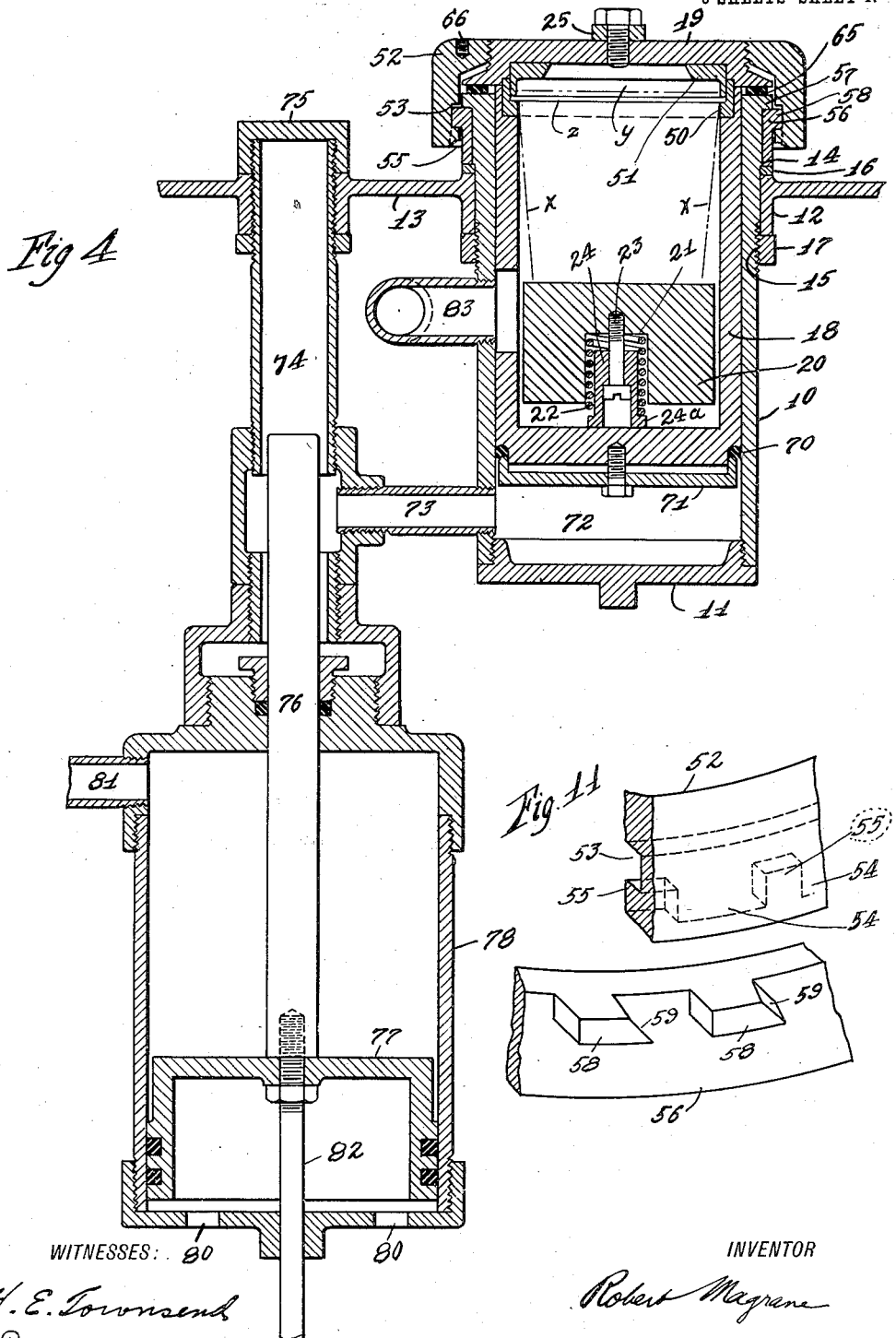

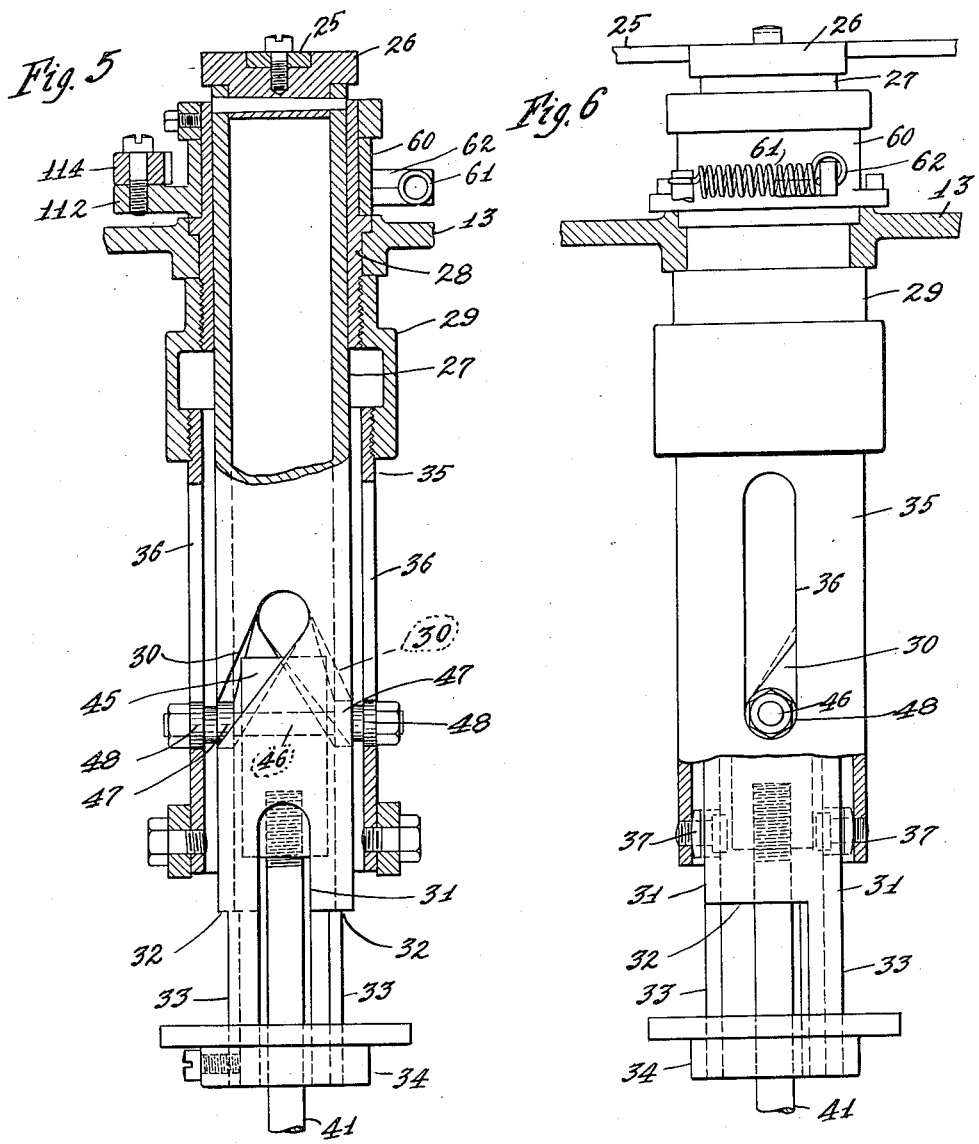

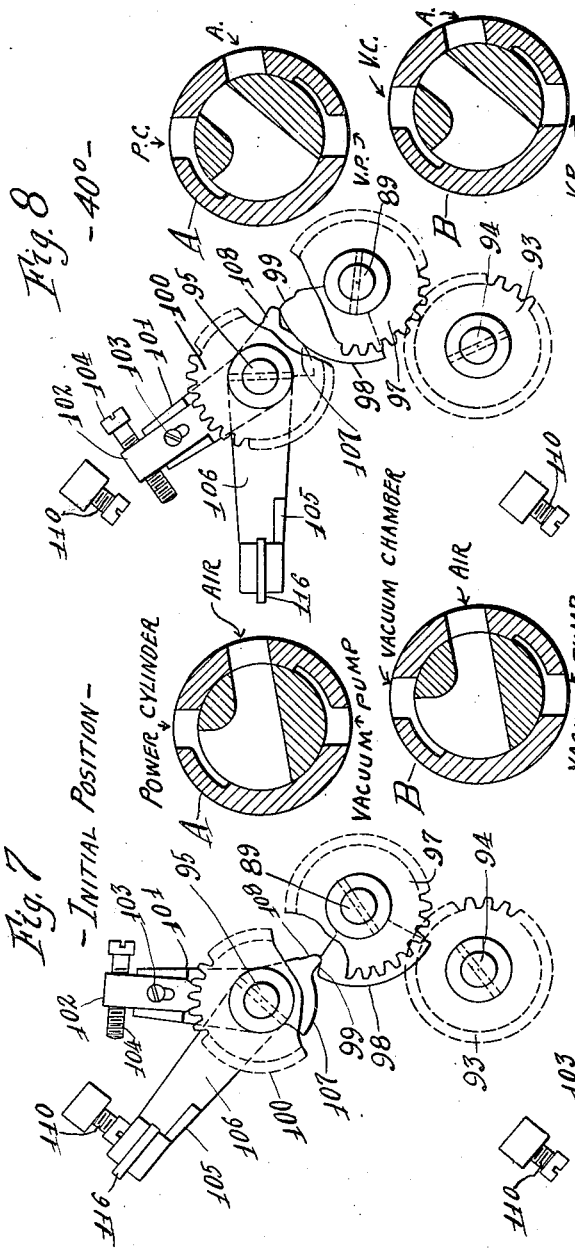

UNITED STATES PATENT OFFICE.

ROBERT MAGRANE, OF NEW YORK, N. Y., ASSIGNOR TO ANCHOR CAP & CLOSURE CORPORATION, OF BROOKLYN, NEW YORK, A CORPORATION OF NEW YORK.

SEALING-MACHINE.

1,134,070.   Specification of Letters Patent.   Patented Mar. 30, 1915.

Application filed February 26, 1914. Serial No. 821,239.

*To all whom it may concern:*

Be it known that I, ROBERT MAGRANE, a citizen of the United States, residing at New York, in the county and State of New York, have invented new and useful Improvements in Sealing-Machines, of which the following is a specification.

This invention relates to sealing mechanism or capping machines, and has particular reference to machines of the vacuum sealing type which are adapted to seal a receptacle under a vacuum by a cap that is joined therewith. Machines of the latter type are equipped with a vacuum chamber which is connected with a vacuum pump, and they also have a power connection, such as a driving belt, electric motor, or other source of power by which the mechanical work of sealing the closure to the receptacle is accomplished.

One object of the present invention is to increase the efficiency of such machines by eliminating dead space within the vacuum chamber; by providing a cup-shaped chamber in order to secure this advantage and to simplify the sealing die construction.

Another object is to provide a suitable resilient support to operate in connection with the special form of vacuum chamber.

Another object is to provide for the operation of a plurality of vacuum chambers in one machine so as to increase its capacity without unnecessary duplication of parts.

Another object is to utilize the power of the vacuum pump to effect the mechanical sealing of the receptacle so that all other power connections may be eliminated.

Another object is to provide a machine that will seal a metallic closure to a glass receptacle without danger of breaking the latter.

Another object is to provide automatic timing means for the operations of exhausting and sealing, so that the receptacle will not be sealed until it has been exhausted of air; and still other objects will appear in the following description and claims.

Figure 1 is a side elevation of a part of the mechanism showing a sealing chamber and valve; Fig. 2 is a plan showing the valve timing mechanism; Fig. 3 is a side elevation in section taken on the line 3—3 of Fig. 2; Fig. 4 is a sectional elevation of the power cylinder and a vacuum chamber taken on the line 4—4 of Fig. 2; Figs. 5 and 6 are elevations, partly in section, of the mechanism for closing the vacuum chambers; Figs. 7, 8, 9 and 10 represent different phases of the valves and valve timing mechanism; and Fig. 11 is a detail of the vacuum chamber locking lugs.

In machines of prior construction, the vacuum chamber has been much larger relatively than the receptacle from which the air is to be exhausted, so that there is considerable dead space within the chamber from which the air must also be exhausted at each operation of the machine. Such construction is doubly defective for these sealing machines require not only a large vacuum pump and consume more power, but they do not secure the highest possible vacuum in the receptacle to be sealed, as the last possible inch or two of vacuum is much more difficult to get than the first ten inches. The present invention aims to minimize these defects by an improved construction.

As best shown in Figs. 1 and 4, the vacuum chamber is formed of a cup-shaped cylinder 10 which is closed at the bottom by a plug cap 11 and is carried within a circular flange 12 forming a part of the table bed 13. The cylinder 10 is equipped with a shoulder 14 and a threaded portion 15 by which together with the collar 16 and nut 17 it is attached to the table bed. Within the cylinder 10 is a second cylinder 18 of a similar form, but movable in a vertical direction and somewhat resembling a trunk piston. A cap 19 fits over the open upper ends of both cylinders and forms the closure for the vacuum chamber. This cap is removable; the receptacle to be exhausted of air and then sealed is dropped into the open cylinder where it occupies the position indicated by the dotted lines $x$, $x$, whereupon the cap is replaced. As shown in Fig. 4, the dead space within the chamber is very small. As the receptacles to be sealed come in different sizes and heights, provision is made for handling these different sizes without undue increase of dead space, within the chamber. Removable blocks of different height, each constructed similar to the one indicated at 20 in Fig. 4, are provided. Each block is circular in form and is provided with a concentric recess 21 containing a spring 22 held in place by a screw 23 and a sliding block 24, the flanged foot 24$^a$ of which is of such size that it will telescope into the recess 21. This construction permits different sizes of blocks to be readily interchanged, each block is adapted to yield slightly to compensate for the unavoidable minor inequalities in glass receptacles, and the construction is such that the block fills nearly all of the vacant space not taken up by the receptacle. The block is made preferably of wood and is treated with paraffin or other suitable material to close the pores so as to exclude air.

In the packing of some food products, such as peanut butter and the like, the exhausting operation must take place by degrees, otherwise the contents of the receptacle will be sucked out of the glass. This requires the sealing machine to be operated slowly and its capacity is thereby reduced. To eliminate this defect, I provide for a plurality of vacuum chambers. In the particular illustration of the invention, two such chambers are disclosed, as shown at 10, 10 in Fig. 2, though it is obvious that this number may be increased as desired. These chambers may be controlled by the same valve mechanism and by the same operating means. In the present instance the chambers have their respective closures applied simultaneously and by the same common mechanism although the closures may be operated successively if desired.

Referring now to Figs. 2 and 4, the caps or closures 19, 19 are both attached to the ends of a thin somewhat elastic beam 25 which is pivoted at its center in a manner to be described. The movement of the caps and the beam in opening the chambers is first vertically upward until the closures are clear of the chambers, and then the caps rotate with the beam 25 in a clockwise direction for a distance of 90 degrees, the caps and the beam then being in the position indicated at 25ª and 19ª in Fig. 2. The closing movement takes place in the reverse order. The construction producing this movement is best shown in Figs. 3, 5 and 6. As there shown, the beam 25 is carried by a head 26 which is pinned to a tubular shaft 27. The shaft 27 has both a vertical and a rotary motion within a bearing sleeve 28 clamped to the table bed 13 by a nipple 29. Two diagonal cam slots 30, 30 diametrically opposite each other are formed in the shaft 27, and also two straight longitudinal slots 31, 31 are formed at its lower end. The shaft 27 is further provided with two shoulder tracks 32, 32, two extensions 33, 33 and a clamp 34 for the extensions. The nipple 29 carries at its lower end a guide sleeve 35 which is equipped with two longitudinal parallel slots 36, 36, and at its lower end is fitted with two rollers 37, 37, located opposite each other.

As shown in Fig. 3, a pedal 38 is fulcrumed at 39 to the frame 40 and is adapted to move the rod 41 downward against the tension of springs 42, 42 when it comes into contact with the collar 43 carried by the rod. An auxiliary spring 44 tends to hold the pedal upward. The upper end of rod 41 enters the tubular shaft 27 and is equipped with a head 45 which carries a fixed shaft 46 upon which are mounted two pairs of rollers 47, 47 and 48, 48. The rollers 47, 47 engage the diagonal slots 30, 30 while the rollers 48, 48 engage the slots 36, 36. When the chambers are open, and the closures are in the broken line position shown in Fig. 2, the springs 42, 42 maintain the rod 41 and its head 45 in their uppermost position, in which position the rollers 47, 47, 48, 48 are in the upper parts of their respective slots 30 and 36. In this position, the shoulder tracks 32 at the lower end of the tubular shaft 27 rest upon the rollers 37. The chambers are closed by depressing the pedal 38 which carries the rod 41 downward as described. The rod and the head 45 cannot rotate as the rollers 48, 48 attached thereto travel in the vertical slot guides 36, 36. The initial movement of the head 45 downward, however, operates upon the diagonal slots 30, 30 in the tubular shaft 27 and rotates the shaft 27, beam 25 and closures 19 in an anti-clockwise direction 90 degrees, in which position the closures are directly over the chambers. The shaft 27 and closures carried thereby are prevented from downward movement during this rotation by the shoulder tracks 32, 32, which are at this time riding on the rollers 37, 37 which support shaft 27 during this part of its movement. When the shaft has rotated 90 degrees, however, the rollers 47, 47 have reached the bottoms of slots 30, 30; and the shoulder tracks 32 have run off their supporting rollers 37, 37 so that the further movement of the head 45 carries downward with it the shaft 27 and the closures carried thereby. During this downward movement of the shaft and closures, any rotation is prevented as the straight open slots 31, 31 in the lower part of the shaft are engaged by the rollers 37, so that the closures move directly downward upon their respective chambers. It will be seen that a single depression of the pedal will cause the closures first to swing through an arc of 90 degrees to a position directly over the chambers and then to move directly downward to seal the chambers, and further, that when the closures are permitted to move upward, by means hereinafter described, they will move directly upward until they clear the chambers and then swing backward 90 degrees to the first position.

The particular method of sealing the receptacle that is indicated at $x$, $x$ in Fig. 4 is by applying a metallic cap indicated at $y$ in the same figure to the receptacle and by squeezing a gasket located between the cap and receptacle to form the seal. A sealing cap of this type and a machine for applying the cap is disclosed in Patent No. 874,201 issued to J. V. Hull, December 17, 1907, to which reference may be made. As indicated in Fig. 4, the cap $y$ is provided with a metallic beading $z$ within which the gasket to be squeezed is located. To effect the squeezing, pressure is brought to bear upon the beading in a vertical line, as described in the patent referred to, by annular jaws located above and below the beading. In machines of the prior art in which such sealing is effected, the lower jaw has necessarily been made sectional. As the receptacle and cap have been inserted in the chamber either through the side or bottom of the chamber, so that the beading has to clear the lower jaw both before and after sealing. This sectional and costly construction of the lower jaw is eliminated in the present machine by providing the cup-shaped vacuum chamber and its cap-like closure. This improved construction permits the lower jaw to be formed simply of a hardened steel annular member, shown at 50 in Fig. 4, which is carried upon an inner shoulder of the piston 18. A coacting annular jaw formed likewise of a single piece of turned steel is mounted upon the underside of the cap 19, as shown at 51 in the same figure. A further advantage of this construction is that it permits the easy change of jaw rings so that the machine may handle different sizes of sealing caps, whereas in former types of machines the substitution of an entire sealing chuck is necessary when the size of the caps is to be changed. This method of mounting the sealing jaws requires the locking of the closure cap 19 to the chamber 10 so that the cap will withstand the thrust of the sealing pressure. The locking means is shown in Figs. 2, 4 and 11. As shown, the perimeter of the cap 19 is threaded to carry a locking member 52 which has an internal annular groove 53 and a series of channels 54, 54 running from the groove downward to the bottom of the member 52. This groove and the channels form the boundaries of a series of internal lugs 55, 55 which project radially inward. Engaging with these lugs is a locking ring 56, which is mounted to oscillate upon the cylinder 10 where it is confined between the collar 16 and a shoulder 57 formed upon the upper end of cylinder 10. This ring is provided with a series of lugs 58, 58 projecting radially outward from the ring and equal in number to the lugs 55, 55 with which they are adapted to engage. As shown in Figs. 2 and 11, the lugs 58 are beveled on one side as at 59, so that when the cap 19 and member 52 are forced downward upon the chamber, the respective sets of lugs contact with each other, and the locking ring 56 is rotated slightly from its normal position owing to the beveled parts 59, 59.

The locking ring 56 is held in its normal position by mechanism best shown in Figs. 2, 5 and 6. Upon the central bearing 28 (Fig. 5) a sleeve 60 is adapted to rotate; this sleeve tends to rotate clockwise as viewed in Fig. 2 under the tension of a spring 61 attached to an arm 62 carried by the sleeve. Each of the locking rings is connected to this sleeve by a pin and slot connection as indicated at 63 in Fig. 2, so that the spring 61 holds each ring in its normal position. As described, when the lugs come in contact, the ring is rotated slightly against the tension of this spring; but when the member 52 reaches its lowest position, the rings snap back to their original position as the lugs 58 latch over the lugs 55, 55 as shown in Fig. 4. Where the two parts of a vacuum chamber are thus locked together, it has been found necessary that the packing joint between the parts be so constructed that a tight joint may be obtained regardless of the wear or varying thickness of the packing. The packing is shown at 65 in Fig. 4 and it is obvious that if this packing be too thick, it will prevent movement downward of the member 52 sufficiently to permit the lugs 58 to latch over the lugs 55 and the two parts will not lock together. On the other hand, if the packing be too thin, there will be a leaking of air into the chamber so that a high vacuum could not be secured. The locking member 52 is therefore attached to the cap 19 by a threaded connection as described, so that the rotation of the member 52 will raise or lower the locking position of the lugs 54 to correspond with any variation in the thickness of the packing ring 65. To prevent accidental displacement of the member 52 after it has been adjusted, it is provided upon its upper surface with a circular series of tapped holes 66 and the beam 25 carries a screw 67 adapted to engage any one of these holes, and thereby clamp the member 52 and beam 25 together so that the adjustment cannot be disturbed.

In machines of the prior art, power for the sealing mechanism has been derived from various sources, all of which have required special connections with the machine. In the present machine, the force of atmospheric pressure operating against a vacuum is utilized to produce the power to operate the sealing mechanism, so that no connection with the machine is required other than the pipe line to the vacuum pump which is needed in any event for vacuum sealing. In this machine therefore the prime mover that drives the vacuum pump also supplies the power for the sealing operation, but does so indirectly through the vacuum pump Referring to Fig. 4, the cylinder 18 is equipped at its lower end with a packing ring 70 and disk 71 below which is a small chamber 72 which communicates through a connection 73 with a closed chamber 74. These compartments 72, 73, 74 are filled up to the cap 75 with a liquid such as glycerin or oil. Moving within the chamber 74 is a plunger 76 which is attached to a piston 77 operating in a clyinder 78, the lower end of which is always open to the atmosphere through apertures 80, 80. The upper part of the cylinder has a connection 81 leading through a valve to the vacuum pump. It is obvious that if the air be exhausted through connection 81 from the upper part of the cylinder, atmospheric pressure operating upon the piston 77 will drive it and the plunger 76 upward. The upper compartments being completely filled with liquid, the parts described operate in the manner of a hydraulic press and the cylinder 18 is forced upward with a heavy sealing pressure against the beading $z$. It is obvious that the piston 77 might be coupled directly to the cylinder 18 and thus have a direct acting mechanism; but the arrangement preferred is better for two reasons; the power cylinder 78 may be made of smaller diameter and be given a comparatively long stroke, so that the packing of the piston is easier and any leakage is less important; and the multiplying pressure device between the power cylinder and the cylinder 18 enables the machine to cap large size receptacles where a greater sealing pressure is required, whereas in the latter case, if the piston 77 were coupled directly it would have to be of abnormal diameter to have sufficient area to develop the required pressure. The piston 77 is provided with a depending rod 82 to which a spring or weights may be attached in order to move the piston 77 downward rapidly after air has been admitted to the upper part of the cylinder. The vacuum chamber is exhausted of air through the connection 83 which leads away from the chamber as shown in Fig. 4.

In a sealing operation, after the vacuum chamber is closed, the air is exhausted from the receptacle and chamber through the passage 83; air is then exhausted from the upper part of the power cylinder 78 to seal the cap $y$ upon the receptacle $x$; air is then admitted to the vacuum chamber so as to relieve the atmospheric pressure upon the cap 19 and permit it to be lifted from the chamber; and air is also admitted to the upper part of the power cylinder 78 to allow the piston 77 to fall. This sequence of events is controlled automatically by suitable valve mechanism. The valve mechanism, however, has other functions to perform. The amount of time required to exhaust the air from a receptable varies in accordance with its size, and to a more important degree, in accordance with the material packed in it. Some material contains but little air; yet if the exhausting process be carried on too rapidly the material will be drawn from the receptacle into the air passages. Means are therefore provided which enable the operator to adjust the machine so that the exhausting time may be automatically determined, and so that the sealing period will immediately succeed the period of exhausting. These various advantages are secured by the valve mechanism which is best shown in Figs. 1, 2, 3 and 7 to 10.

As shown in Fig. 3, the valves are operated by the pedal 38. The pedal is equipped with diametrically opposed ears one of which is shown at 85, each of which is equipped with a roller 86 engaging a slotted cam 87. The cam is mounted upon a rotatable shaft 88 which rotates a vertical shaft 89 through a universal coupling 90. A torsional spring 91 is attached to shaft 89 as shown. The slotted cam 87 is so cut that the combined downward and upward movement of the pedal causes the cam and its shaft to rotate 120 degrees in one direction against the tension of spring 91, and at the extreme upper position of the pedal the roller 86 rides out of the cam slot and the shaft then rotates backward 120 degrees to its original position under the tension of torsional spring 91.

As shown in Figs. 1 and 3, the shaft 89 carries a gear 92 which meshes with a gear 93 attached to the stem 94 of a valve B. The valve A is shown in Fig. 3 and is equipped with an elongated stem 95 which passes upward through the table bed 13. This stem carries a torsional spring 96 which always tends to return the stem 95 and valve A to initial position. Shaft 89 and stem 95 project upward through the table bed as shown in Fig. 2, and the connections with the upper ends of these shafts are best shown in Figs. 7 to 10. As there shown the shaft 89 has a gear 97 keyed thereto and also a quadrant 98, one end of which, 99, has a tooth form. Meshing with gear 97 is a gear 100 which is loose upon the stem 95. An arm 101 is also mounted loosely upon stem 95 and this arm carries a block 102 fastened thereto by the screw and slot connection 103 which permits the block to be moved radially upon the arm. The inner end of the block is provided with teeth adapted to engage the teeth of the gear 100 so as to lock the arm and gear together. The outer end of the block carries a screw 104 adapted to contact with a lug 105 which is formed upon an arm 106 that is pinned to the stem 95. The inner end of the arm 106 terminates in a quadrant 107 having a single tooth 108 which is engaged by the quadrant 98 as shown in Fig. 7. An adjustable stop 110 is provided for arm 106 to resist the tension of the torsion spring upon stem 95. In Fig. 7, these parts are in their initial position and at rest. In Fig. 8 the pedal has been partly depressed, the shaft 89 has rotated clockwise 40 degrees. Through shaft 89, gear 93 has been rotated 40 degrees, moving with it stem 94 and valve B; stem 95 carrying valve A has also been moved 40 degrees by quadrant 98 moving tooth 108 forming a part of lever 106 pinned to the stem 95 and the arm 101 has also moved 40 degrees, having been driven through gears 97 and 100. In Fig. 9 the shaft 89 has advanced 80 degrees. Stem 94 and valve B have also advanced 80 degrees. Stem 95, however, is still in the same position as in Fig. 8, having made no advance during this period owing to the formation of the quadrants 98 and 107 and the position of valve A has not changed. Arm 101 has advanced 80 degrees because of its gear connection, and the screw 104 is now contacting with the lug 105 on lever 106. In Fig. 10, the pedal has almost reached its highest position, shaft 89 has been moved 120 degrees, as has also stem 94 carrying valve B. Arm 106 and valve A have moved 80 degrees, the new movement being due to the contact of screw 104 to the lug 105, the drive being through gears 97, 100, arm 101, arm 106 to stem 95. When the pedal reaches its highest position the shaft 89 escapes the control of the cam 87 and the torsion springs 91 and 96 immediately snap back both valves to the initial position shown in Fig. 7. The same figures illustrate the corresponding movements of the valves A and B. In Fig. 7, the machine is at rest, the power cylinder 78 is open to air through valve A and the vacuum pump cut off, and in this position the power piston 77 is in its lower position. The vacuum chamber is uncapped and is also open to the air through valve B, and the vacuum pump is cut off. In Fig. 8, the depression of the pedal has closed the vacuum chamber. Valve B has cut off the air passage thereto preliminary to opening communication with the vacuum pump. Valve A has moved to a similar position with respect to the power cylinder. In Fig. 9, the valve B has continued its movement, so that the vacuum chamber has been connected with the air pump and the exhausting of the chamber has taken place. Valve A however is still in the same position as that shown in Fig. 8. In Fig. 10, a further movement of valve B has taken place without changing the connection of the vacuum pump and vacuum chamber. The movement of valve A has now connected the power cylinder with the vacuum pump, so that the power piston moves upward under atmospheric pressure and operates through the means described to attach the sealing cap to the exhausted receptacle. At the last instant, the valves are released and snap back under spring tension to the position shown in Fig. 7. This movement shuts off the vacuum pump and admits air both to the vacuum chamber and the power cylinder, so that the chamber may be easily opened and the power piston may drop to its original position. Referring again to the mechanism which accomplishes these valve movements, it will be noticed that the chamber remains connected with the vacuum pump from the time the chamber is closed (first 40 degrees of movement) until the valves are allowed to spring back. Also that the power cylinder is connected with the vacuum pump from the time the screw 104 contacts with lug 105 to move the arm 106, and thereby the valve A, until the valves spring back. This latter timing is adjustable and may be changed within small limits by adjusting the screw 104 and within a larger range by shifting the arm 101 relatively to the gear 100 with which it is locked, the block 102 acting as a latch bolt to lock the arm and gear together in any relative angular position. The action of the power cylinder and the consequent sealing of the receptacle may thus be timed to take place at an early or late instant as desired, or in other words the valve A may be given any lag desired relative to the movement of valve B. This mechanism may also be adjusted with reference to the sealing pressure exerted upon the cap and glass to be sealed, as the time that the valve allows atmospheric pressure to operate upon the power piston may be varied. This cut-off of the connection between the vacuum pump and the power cylinder will determine the sealing pressure brought to bear upon the sealing jars, so that the machine may be adjusted to effect the sealing operation without exerting such pressure as to break the glass, when the receptacle is formed of that material.

Provision is made for automatically opening the vacuum chambers after the sealing operation is completed; and in order to insure proper sealing, this automatic opening is made controllable by the valve mechanism, so that the chambers cannot be opened until after the valves have performed their various functions. This mechanism is best shown in Figs. 2 and 3. The locking sleeve 60 carries an arm 112 upon which is pivoted at 113 a pawl 114 to which a small spring 115 is attached. Arm 106 is tipped with an adjustable steel plate 116 which is adapted to contact with the pawl 114. When the machine is at rest, arm 106 (Fig. 2) rests against the stop 110 to the extreme left of the position shown in the figure. In the movement of arm 106 from left to right upon the depression of the pedal plate 116 wipes the pawl 114 and rocks it idly. On the return movement, however, when the valves have been released and are springing back under spring tension, as described, the arm 106 sweeps from right to left and in doing so plate 116 contacts with pawl 114 which does not give in this direction, so that the pawl is moved to the left together with arm 112, thus rotating sleeve 60 against the tension of spring 61. This movement of sleeve 60 causes a corresponding movement of the locking rings 59, thereby disengaging lugs 58 from the lugs 55 and unlocking the caps 19, whereupon the springs 42, 42 previously described, cause the caps to rise from the chambers and assume the broken line position shown in Fig. 2.

As shown in Figs. 1 and 2, a spring buffer comprising a spring 117, plunger 118, bell crank 119 pivoted at 120 is provided to check the momentum of the cap 19 and locking member 52 as it moves to its position over the chamber 10 and also to assist in the swinging movement of parts 19 and 52 when the chamber is opened. This mechanism forms no part of the present invention. As indicated above, the construction of both vacuum chambers is alike. They are equipped with common exhaust and pressure connections, and the area of power piston 77 and the length of its stroke is calculated to cause a sealing movement under the necessary pressure in both of the chambers simultaneously.

What is claimed:

1. In a vacuum sealing machine, a cup-shaped vacuum chamber, an annular sealing ring mounted in the chamber, a cap adapted to form a closure for the chamber, an annular sealing ring mounted upon the cap, the said rings being positioned to coact with each other to effect a sealing operation when the cap and chamber are in contact, and mechanism adapted to cause relative movement between the cap and chamber to open and close the chamber.

2. In a vacuum sealing machine, a cup-shaped vacuum chamber, an annular sealing ring mounted in the chamber, a cap adapted to form a closure for the chamber, an annular sealing ring mounted upon the cap, the said rings being positioned to coact with each other to effect a sealing operation when the cap and chamber are in contact, mechanism adapted to open and close the chamber by relative movement of cap and chamber, and a locking device for locking the cap and chamber together when in their closed position.

3. In a vacuum sealing machine, a plurality of vacuum chambers, a plurality of closures for the chambers, sealing mechanism positioned within each chamber, a power device operating by atmospheric pressure and adapted to actuate the sealing mechanisms, and exhausting connections for the chambers and the power device.

4. In a vacuum sealing machine, a plurality of vacuum chambers, a plurality of closures for the chambers, sealing mechanism positioned within each chamber, a power device operating by atmospheric pressure, means whereby the power device is adapted to operate the plurality of sealing mechanisms, and exhausting connections for the chambers and the power device.

5. In a vacuum sealing machine, a vacuum chamber comprising two separable parts, an integral annular sealing jaw mounted upon each part, and means adapted to operate the jaws to effect a mechanical seal.

6. In a vacuum sealing machine, a vacuum chamber comprising two separable parts, an integral annular jaw mounted upon each part, means adapted to operate the jaws to effect a mechanical seal, and a locking mechanism adapted to hold the parts together during the operation of sealing.

7. In a vacuum sealing machine, a vacuum chamber and its closure, a device for locking the closure to the chamber, sealing mechanism located within the chamber, and means operating automatically upon the locking device to release the closure after the said sealing mechanism has been actuated to effect a seal.

8. In combination, a vacuum sealing chamber comprising two parts adapted to be opened and closed by relative movement of the parts, a series of locking lugs carried by each part and adapted to coact to lock the two parts together, and a sealing mechanism located within the chamber.

9. In a vacuum sealing machine, exhausting connections, a vacuum chamber and its closure, a mechanical sealing device located within the chamber, and actuating means for the sealing device in communication with said connections and adapted to be operated by atmospheric pressure.

10. In a vacuum sealing machine, exhausting connections, a vacuum chamber and its closure, a mechanical sealing device located within the chamber, actuating means for the sealing device in communication with said connections and adapted to be operated by atmospheric pressure, and a valve for controlling the said actuating means.

11. In a vacuum sealing machine, exhausting connections, a vacuum chamber and its closure, a sealing device located within the chamber, actuating means for the sealing device in communication with said connections and adapted to be operated by atmospheric pressure, a pedal for operating the closure, and a valve actuated by the pedal and adapted to control the said actuating means.

12. In a vacuum sealing machine, exhausting connections, a vacuum chamber and its closure, a sealing device located within the chamber, actuating means for the sealing device in communication with said connections and adapted to be operated by atmospheric pressure, a pedal for operating the closure, a valve actuated by the pedal and adapted to control the said actuating means, and means to determine the time of actuation of said valve.

13. In a vacuum sealing machine, exhausting connections, a vacuum chamber and its closure, a mechanical sealing device located within the chamber, a cylinder in communication with said connections and a piston for the cylinder adapted to be operated by atmospheric pressure, and means to actuate the sealing device by movement of the piston.

14. In a vacuum sealing machine, exhausting connections, a vacuum chamber and its closure, a sealing mechanism located within the chamber, a power device in communication with said connections and operated by atmospheric pressure, and a power transmission means located between the said sealing device and said power device and adapted to multiply the pressure of said power device and to actuate the sealing mechanism.

15. In a vacuum sealing machine, exhausting connections, a vacuum chamber and its closure, a sealing mechanism located within the chamber, a power device in communication with said connections and operated by atmospheric pressure, and a hydraulic power transmission means located between the sealing device and said power device and adapted to multiply the pressure of said power device and to actuate the sealing mechanism.

16. In a vacuum sealing machine, a cylinder, a cylinder head, a cup-shaped piston located within the cylinder and adapted to hold a receptacle to be sealed, and means to move the piston toward the cylinder head to effect a sealing operation upon the receptacle.

17. In a vacuum sealing machine, exhausting connections, a cylinder in communication with said connections, a piston located within the cylinder and adapted to be operated by atmospheric pressure, a plunger connected with the piston, mechanical sealing mechanism, and means whereby a movement of the plunger is adapted to actuate the sealing mechanism.

18. In a vacuum sealing machine, exhausting connections, a plurality of vacuum chambers, sealing mechanism located in each chamber, a cylinder in communication with said connections, a piston located within the cylinder and adapted to be operated by atmospheric pressure, a plunger connected with the piston, and means whereby a movement of the plunger is adapted to actuate the respective sealing mechanisms.

19. In a vacuum sealing machine, exhausting connections, a vacuum chamber and its closure, a mechanical sealing device located within the chamber and adapted to be actuated by atmospheric pressure, and a valve mechanism in communication with said connections and adapted to control the exhausting and the sealing operations.

20. In a vacuum sealing machine, exhausting connections, a vacuum chamber and its closure, a sealing device located within the chamber and adapted to be actuated by atmospheric pressure, a valve mechanism in communication with said connections and adapted to control the exhausting and the sealing operations, and a pedal for actuating the closure and the valve mechanism.

21. In a vacuum sealing machine, exhausting connections, a vacuum chamber and its closure, a pedal for operating the closure, a sealing device located within the chamber and adapted to be operated by atmospheric pressure, a valve in communication with said connections for controlling the operation of the sealing device and mechanism for operating the valve by the pedal, the said mechanism including adjusting means to time the action of the valve.

22. In a vacuum sealing machine, a vacuum chamber and its closure, a sealing device located within the chamber, a valve for controlling the exhausting operation, a valve-controlled actuating means for the sealing device, and mechanism for determining the respective valve movements.

23. In a vacuum sealing machine, exhausting connections, a vacuum chamber and its closure, a sealing device located within the chamber, means operated by atmospheric pressure and adapted to actuate the sealing device, a valve in communication with said connections controlling the exhausting of the vacuum chamber, a second valve in communication with said connections operating in sequence to the first valve and adapted to control the actuating means for the sealing device, and adjustable mechanism for determining the time of operation of the respective valves.

24. In a vacuum sealing machine, a vacuum chamber and its closure, locking mechanism for the chamber and closure, a sealing device located within the chamber, means for actuating the device by gaseous pressure, a valve for controlling the exhausting operation, a second valve controlling the actuating means for the sealing device, and connections with the second valve adapted to operate the said locking mechanism.

25. In a vacuum sealing machine, exhausting connections, a sealing mechanism, a hydraulic press for operating the sealing mechanism and means for creating the hydraulic pressure, the said means being in communication with said connections and actuated by atmospheric pressure.

ROBERT MAGRANE.

Witnesses:
 IDA L. ENGELHARDT,
 J. A. GRAVES.